United States Patent [19]
Ruzek

[11] Patent Number: 5,985,342
[45] Date of Patent: *Nov. 16, 1999

[54] CHEMICAL TREATMENT AND PACKAGING SYSTEM TO IMPROVE THE APPEARANCE AND SHELF LIFE OF FRESH PORK

[75] Inventor: David C. Ruzek, Austin, Minn.

[73] Assignee: Hormel Foods Corporation, Austin, Minn.

[*] Notice: This patent is subject to a terminal disclaimer.

[21] Appl. No.: 09/062,265

[22] Filed: Apr. 17, 1998

Related U.S. Application Data

[63] Continuation-in-part of application No. 08/725,858, Oct. 4, 1996, Pat. No. 5,780,085.

[51] Int. Cl.$^6$ .............. A23B 4/20; A23B 4/24; A34L 1/314
[52] U.S. Cl. ............. 426/281; 426/326; 426/327; 426/332
[58] Field of Search .................... 426/129, 264, 426/265, 281, 324, 326, 327, 332, 335, 641, 393

[56] References Cited

U.S. PATENT DOCUMENTS

| | | |
|---|---|---|
| 2,255,796 | 9/1941 | Linane et al. . |
| 2,596,067 | 5/1952 | Brissey . |
| 3,047,404 | 7/1962 | Vaughan . |
| 3,076,713 | 2/1963 | Maas . |
| 3,154,421 | 10/1964 | Voegeli et al. . |
| 3,154,423 | 10/1964 | Voegeli et al. . |
| 3,491,504 | 1/1970 | Young et al. . |
| 3,595,567 | 7/1971 | Lee et al. . |
| 3,625,713 | 12/1971 | Mixon . |
| 3,695,892 | 10/1972 | Reinke . |
| 3,851,080 | 11/1974 | Lugg et al. ............... 426/312 |
| 3,852,407 | 12/1974 | Toby ........................ 426/513 |
| 3,930,040 | 12/1975 | Woodruff .................. 426/312 |
| 4,038,426 | 7/1977 | Jespersen et al. ........ 426/266 |
| 4,072,763 | 2/1978 | Mart ......................... 426/513 |
| 4,210,677 | 7/1980 | Huffman ................... 426/272 |
| 4,287,218 | 9/1981 | Rich et al. ................ 426/272 |
| 4,313,963 | 2/1982 | Greenspan ................. 426/58 |
| 4,574,087 | 3/1986 | Sheehy et al. ............ 426/129 |
| 4,642,239 | 2/1987 | Ferrar et al. .............. 426/396 |
| 4,683,139 | 7/1987 | Cheng ....................... 427/265 |
| 4,798,729 | 1/1989 | Anders et al. ............. 426/326 |
| 4,812,320 | 3/1989 | Ruzek ....................... 426/393 |
| 4,818,548 | 4/1989 | Cheng ....................... 426/265 |
| 4,844,929 | 7/1989 | Kingsley ................... 426/326 |
| 4,948,326 | 8/1990 | Schvester et al. ........ 426/316 |
| 4,948,621 | 8/1990 | Schwartz ................... 426/652 |
| 5,192,570 | 3/1993 | Bender et al. ............ 426/332 |
| 5,226,531 | 7/1993 | Garwood ................. 206/213.1 |
| 5,332,547 | 7/1994 | Olson et al. ................ 422/3 |
| 5,334,405 | 8/1994 | Gorlich ..................... 426/396 |
| 5,348,752 | 9/1994 | Gorlich ..................... 426/129 |
| 5,352,467 | 10/1994 | Mitchell et al. .......... 426/316 |
| 5,354,568 | 10/1994 | Bender et al. ............ 426/332 |

FOREIGN PATENT DOCUMENTS

Wo 82/01640   5/1982   WIPO .

OTHER PUBLICATIONS

"The effects of diacetate with nitrite, lactate, or pediocin on the viability of *Listeria monocytogenes* in turkey slurries", J. H. Schlyter et al., International Journal of Food Microbiology, 19 (1993), pp. 271–281.

"Inhibition of *Listeria monocytogenes* and Other Bacteria by Sodium Diacetate", L. A. Shelef et al., Journal of Food Safety, 14 (1994), pp. 103–115.

"Emerging mechanisms for pathogen and spoilage control", J. Bacus, *The National Provisioner*, Feb. 25, 1989, pp. 18–19.

Article regarding sodium lactate–water activity–liver pate–shelf life, *Fleischwirtsch*, 69 (2) (1989), pp. 223–224 and three pages of graph information.

*Primary Examiner*—Arthur L. Corbin
*Attorney, Agent, or Firm*—Merchant & Gould P.C.

[57] ABSTRACT

A process for packaging fresh pork wherein the fresh pork package has enhanced visual appeal and shelf life stability, the process including the steps of introducing into the pork a treatment solution comprising a lactate buffer salt and a diacetate microbial growth inhibitor, and packaging the pork in a packaged unit. The packaged unit can comprise a display unit comprising a thermoplastic tray covered by a transparent film, and one or more display units can be packaged in a film wrapped container. The atmosphere within the container can maintained as a high oxygen atmosphere.

19 Claims, 1 Drawing Sheet

CHEMICAL TREATMENT AND PACKAGING SYSTEM TO IMPROVE THE APPEARANCE AND SHELF LIFE OF FRESH PORK

CROSS REFERENCE TO RELATED APPLICATIONS

This application is a continuation-in-part of U.S. Ser. No. 08/725,858, filed Oct. 4, 1996, now U.S. Pat. No. 5,780,085.

FIELD OF THE INVENTION

The invention relates to an improved packaged fresh pork and processes for packaging the pork. The fresh pork is treated with an aqueous solution and packaged in a display unit. Such a unit can be shipped in a master container such as a master bag or container or master conforming box. The resulting pork product can be processed and transported from a packing house directly to a retail outlet where the pork in the display unit can be displayed for retail sale in a retail case. At the retail outlet the display unit is removed from its master bag or conforming box (if necessary) and is placed in a display cooler. The cooperation between atmosphere, packaging and treatment provides an improved pork product. Further, a selected packaging atmosphere and a related package system can improve the quality and consumer acceptance of the pork and to improve its shelf life.

BACKGROUND OF THE INVENTION

The treatment and packaging of fresh pork has been a subject of intense research and development for many years. A variety of fresh pork treatment chemicals, packaging atmospheres and packaging materials are known. A vast variety of chemical treatment materials or pumping solutions have been used including sugar, salts, curing compounds, ascorbate, isoascorbate, etc. A useful atmosphere can contain varying proportions of inert gases such as argon, nitrogen, etc., red pigment forming gases such as oxygen, carbon monoxide and other gases such as carbon dioxide. Many such atmospheres have been evaluated in conjunction with a number of packaging systems. Pork packaging has been made from many types of packaging materials including paper, paperboard, corrugated paperboard, film, metallized film, foam plastic and rigid plastic wrap, etc.

We are aware of certain patents that generally teach a variety of meat packing systems. Vaughan, U.S. Pat. No. 3,047,404, teaches a packaging system for red meats. The meat is packaged in a film wrapped container which is then stored in a transportable rigid, box-like container having a high oxygen atmosphere. Voegeli et al., U.S. Pat. No. 3,154,421, discloses that a desirable bright red fresh meat color can be enhanced and maintained for about seven days if fresh meat is packaged in the ambient atmosphere. The meat is contacted with a treatment solution comprising phosphate salts, ascorbic acid or salts thereof and a sequestrant agent. Lugg et al., U.S. Pat. No. 3,851,080, teach fresh meat maintained in a controlled atmosphere containing a majority of carbon dioxide, a smaller amount of molecular oxygen, the balance being nitrogen. Preferred atmospheres contain between 10 and 40 vol % carbon dioxide, 12 and 20 vol % oxygen and 50 to 70 vol % nitrogen. Ferrar et al., U.S. Pat. No. 4,642,239, teach a package having a controlled atmosphere having a high oxygen concentration. Ferrar et al. teach a unique packaging system having a film having an oxygen permeability higher than its carbon dioxide permeability. Such a packaging system ensures that the oxygen content inside the container remains high to maintain the fresh red appearance of the meat. Cheng, U.S. Pat. Nos. 4,683,139 and 4,818,548, teaches a process for prepacking fresh meat, enhancing and improving the consistency of the meat quality at the point of retail sale and to increase the shelf life of meat. In the Cheng package, chemically treated meat is packaged in a controlled atmosphere containing 20–80% carbon dioxide and from about 2–30% oxygen, any balance is nitrogen. The treatment solution contains active components including certain phosphate compounds, a reducing agent and an organic sequestrant such as citric acid, tartaric acid, EDTA, etc. Schvester et al., U.S. Pat. No. 4,946,326, teach seafood packaging using an atmosphere having a substantial portion of inert gas such as nitrogen or argon, 50 vol % carbon dioxide and 20 vol % oxygen.

Prior art processes are costly, can be complex and often serve to merely mask spoilage and not prevent microbial growth. A substantial need exists to improve the fresh meat packaging technology relating to substantially preventing microbial growth in fresh pork products including bone-in products and bone-free products such as half carcasses, whole loins, roasts, cuts, chops, ground pork, etc. A substantial need exists to obtain tender cut pork portions, to maintain a quality of appearance and shelf stability of cut meat and to reduce purge in a simple easily used packaging system using a treatment solution and packaging. A substantial need exists to provide a product having an extended shelf life and an attractive fresh red meat appearance, while maintaining high quality flavor, stabilized microbiology, tenderness and consumer acceptance that is low in cost and easily implemented with a chemical treatment, packaging system and atmosphere.

BRIEF DISCUSSION OF THE INVENTION

We have found that the appearance measured by color and freedom from purge, shelf life including reduced microbial growth, texture and tenderness of the cut meat portions and cooked flavor of the fresh meat cuts can be enhanced by a cooperation between atmosphere, packaging and treatment chemicals. The treatment chemicals can include a lactate component that is a flavor enhancer and an antimicrobial and a diacetate microbial growth inhibitor component. These chemicals can help maintain the quality and stability of the meat. Alternatively, the treatment chemicals include a lactate component that is a flavor enhancer and an antimicrobial, a phosphate or condensed phosphate sequestrant composition and a diacetate microbial growth inhibitor component. This combination can also stabilize and maintain product quality. The unique process includes first treating the meat with an aqueous treatment solution consisting essentially of a sodium lactate composition and an alkali metal diacetate microbial growth inhibitor or retardant. An alternate process includes first treating the meat with an aqueous treatment solution containing a sodium lactate composition, a phosphate sequestrant composition and an alkali metal diacetate microbial growth inhibitor or retardant. Such treated meat, using either treatments, can be cut or sliced, if needed and can be packaged in a display unit comprising a film wrapped package, or display unit, for a retail case. Such display units can, in turn, be packaged in temporary or permanent packaging. The packaging can be designed for transportation, distribution and presale storage in any arbitrary packaging which can be included in a bag or container such as a sealed master container or bag.

An enhanced oxygen atmosphere can be used with the disclosed packaging. The product configuration can comprise a display unit that is flushed and filled resulting in a high oxygen atmosphere. The high oxygen atmosphere in the package can comprise about 50–85 vol % oxygen and about 15–30 vol % carbon dioxide. Preferably the high oxygen atmosphere comprises about 60–80 vol % oxygen and less than about 20 vol % carbon dioxide. Such a high oxygen atmosphere is provided by filling the display unit with an artificial atmosphere comprising greater than 85 mole %, preferably 90–100 mole % $O_2$. In the instance the display unit is shipped directly to a retail outlet, the film used in making the display package can comprise an oxygen barrier film to maintain the oxygen atmosphere within the display unit. In the instance that the display unit is packaged in a master container or master bag system containing an oxygen atmosphere, the display is typically packaged in an oxygen permeable film to ensure that any oxygen consumed inside the package can be replenished by oxygen from the atmosphere within the master bag or container that contains the display units. At the retail outlet, the master bag or container is opened and the display units are removed for retail display.

For the purpose of this patent application the term "oxygen barrier" or "oxygen barrier film" relates to a film or other useful packaging material that retains oxygen. Such a barrier preferably prevents the permeation of oxygen through the film and out of the package at a rate such that the internal atmosphere of the packaging material loses less than about 8 to 10 vol % of oxygen during the product shelf life (typically less than about 30 days) to transport of oxygen through the barrier. Similarly a "$CO_2$ barrier" prevents movement of $CO_2$. Oxygen can be consumed through absorption by the meat or by bacterial growth. The oxygen barrier bag has an oxygen permeability of less than about 200 cc-$O_2$/m$^2$·day·atm@73° C.; preferably less than 145 cc-$O_2$/m$^2$·day·atm@73° C. $CO_2$ barrier materials have similar numbers for $CO_2$ film properties. The term "oxygen permeable film" is a term directed to a film packaging material surrounding the fresh pork that can permit the transfer of oxygen from the exterior of the package to the interior of the package, when placed in the master bag, at a rate such that the oxygen content in the interior does not change substantially as oxygen is consumed within the package over the lifetime of the packaged pork, typically up to 30 days.

The term "oxygen permeability" or "oxygen permeable film" or packaging material is relates to a material having a permeability of greater than about 10,000 cc/m$^2$·day·atm@73° C.; preferably greater than about 17,000 cc/m$^2$·day·atm@73° F. Similar permeability values relate to $CO_2$ film properties. Preferred $CO_2$ permeability ranges from 122,000 cc-$CO_2$/m2·24 hrs., @73° F. and 100% RH, to 201,500 cc-$CO_2$/m2·24 hrs. @73° F. and 100% RH.

The term "extended shelf life" relates to maintaining the quality of the fresh pork in the packaging described in this invention for a period of at least about 17 days including at least 3 days in the display case. The atmosphere installed in the display unit and in master bag maintained within the oxygen barrier can be at least 65 vol % oxygen, the balance comprising carbon dioxide. The quality of the meat, the components in the treating solution, the package and the package atmosphere cooperate to form a superior cut of meat having a true fresh meat appearance, an extended shelf life and highly acceptable consumer taste and tenderness when cooked. The term "appearance" relates both to the color of the meat and to the absence of visible contaminants or substances that would tend to be unacceptable to a retail consumer such as substantial purge or other accumulated material. "Crust freezing" in the context of this application relates to lowering the temperature of the meat portion to a degree such that the exterior surface of the meat freezes to a depth of about 16 mm (⅝ inch), preferably 10 mm (⅜ inch). Such crust freezing stabilizes the meat for cutting. Fresh meat in the context of this patent application indicates meat that has not been frozen except for the crust freezing procedure and the interior of the temperature of the meat does not experience a temperature less than about −3° C. (27° F.). The term "master bag" refers to a film or film laminate or multilayer film container that has sufficient mechanical properties to adequately support and contain multiple display units, each unit containing at least one serving portion of fresh pork. Further, the master bag must be an oxygen barrier bag having oxygen permeability sufficient to maintain the oxygen content in the atmosphere within the bag for the product lifetime. The term "phosphate sequestrant" typically refers to inorganic phosphate sequestering materials such as phosphate, pyrophosphate, tripolyphosphate, metaphosphate and other phosphorus based sequestering compositions and equivalents thereof.

The meat packing industry has a continued effort to improve the quality of meat products, however, there is a continuing need to reduce costs in packaging while improving shelf life of meat products by reducing growth of bacteria on the cut during manufacturing, storage, distribution and sale. Similarly, a substantial need exists to improve the appearance of the meat by maintaining a natural pink color with substantially no purge, i.e. accumulation of liquid associated with a meat. Further maintaining a tender cut after slicing is also desirable. We believe we have attained several of these goals and other improved aspects of the product.

DETAILED DISCUSSION OF THE INVENTION

Figure 1:
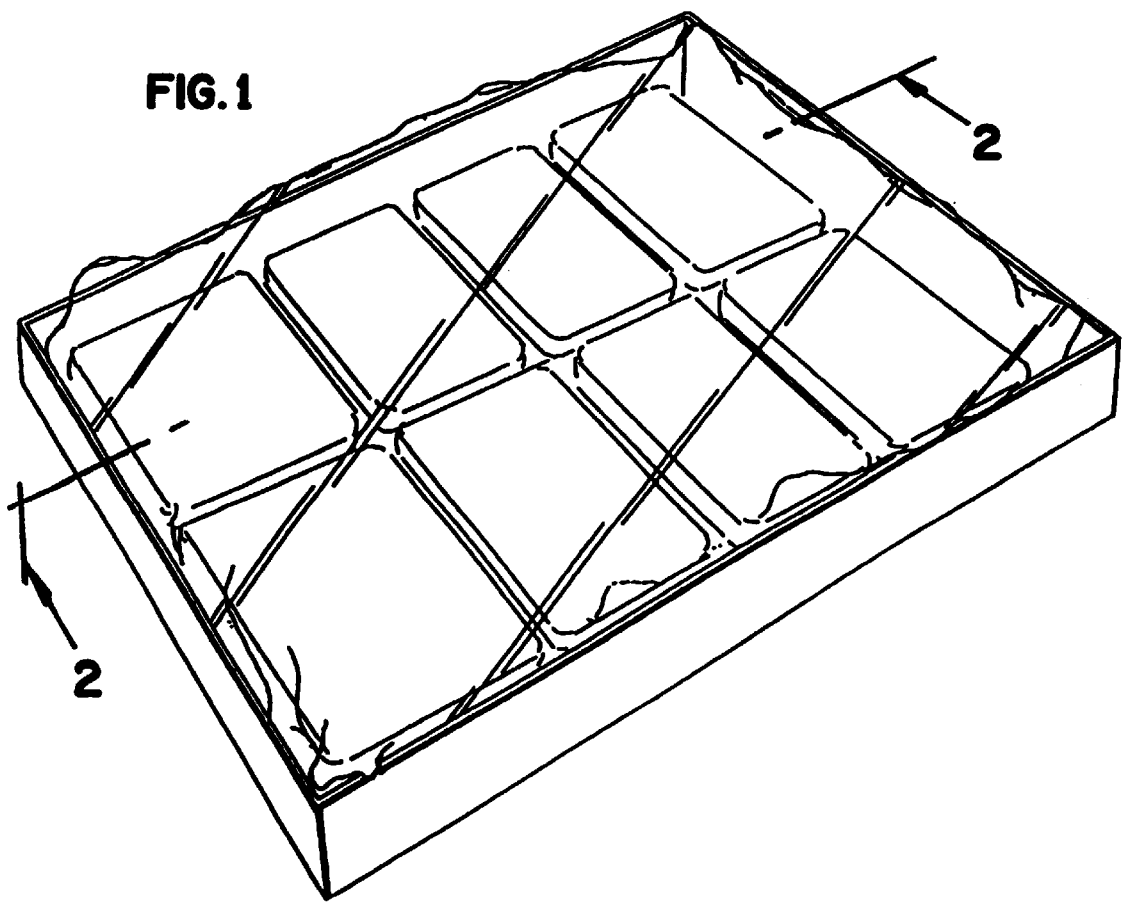
FIGS. 1 and 2 are views of a preferred packaging system of the invention. The figures show a number of wrapped display units packaged within a master bag held within a convenient corrugated paperboard container fitted to the master bag display unit assembly. This product assembly is the result of a process in which the meat is packed in the display units using a non-oxygen barrier wrapping with an artificial atmosphere. The display units are then packaged in an oxygen barrier master bag with improved atmosphere. The master bag display unit assembly is then used in conjunction with the corrugated paperboard unit which promotes ease of production, transportation, storage and retail display. The fresh pork in the display unit has been effectively treated with an improved chemical treatment system disclosed herein.
Figure 2:
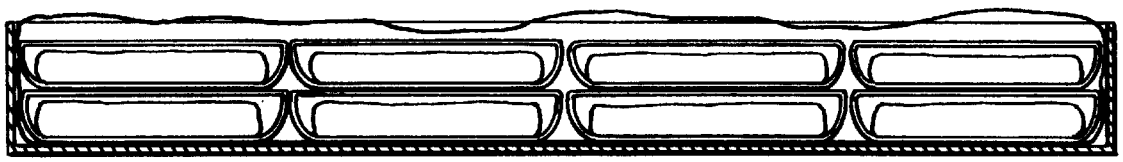

The invention involves, in part, a significantly improved fresh cut pork product that has been attained through a close cooperation between packaging material and aqueous treatment solution. Briefly, the process for manufacturing a high quality product of the invention involves first obtaining a primal cut of pork, treating the pork with an aqueous treatment disclosed herein, optionally slicing the pork, packaging the fresh pork in an oxygen permeable film display unit with an high oxygen atmosphere. The display unit can be further packaged in an oxygen barrier master bag or container containing a high oxygen atmosphere.

In somewhat greater detail, such primal cuts include large meat units such as fresh pork products including bone-in products and bone-free products such as half carcasses, whole loins, roasts, cuts, chops, ground pork, etc. Primal cuts also include individual serving size cuts (i.e., pork portions weighing 8 oz, 6 oz, 4 oz, etc.) and portions. Such primal units can be efficiently treated with aqueous solutions through pumping or injecting the meat with aqueous treatment solutions. The bone in such a bone-in primal cut can optionally be first sprayed with an aqueous solution of a reducing agent such as ascorbic acid. The pork can be treated with an aqueous solution consisting essentially of a sodium lactate and a diacetate bacterial growth inhibitor. The pork can also be treated with an aqueous solution comprising a sodium lactate, a phosphate sequestering agent and a diacetate bacterial growth inhibitor. The aqueous solution is administered by conventional technology including direct injection, vacuum massage, pumping, etc. The meat can be then crust frozen and tempered at a temperature preferably between about −2° C. and −1° C. (between about 28° F. and 30° F.). The stabilized meat from the crust freezing step is optionally sliced into individual serving portions and packaged in a wrapping to form a display unit in a preferred high oxygen atmosphere. Before sealing, the package can be optionally exposed to a vacuum and is then flushed with a preferred oxygen atmosphere. Such an atmosphere can contain a major proportion of oxygen and a minor proportion of carbon dioxide. Optionally, at least one of the display units, with its atmosphere, is placed in a master bag or master container. Preferably, the master bag contains two to twenty, preferably four to ten display units. The master bag is preferably manufactured from a film or film laminate material. Before sealing the master bag, the interior of the master bag can exposed to vacuum and is then flushed with the preferred oxygen atmosphere. One, two or more master bags can be placed in a box adapted to contain the master bag(s). After packaging, the materials are maintained at a temperature of between about −2° C. and 0° C. (about 28 to 32° F.) until purchased by the consumer.

Film Wrapping

Useful materials that act as the wrapping material for the display unit can include such well known films as polyvinylchloride, polycarbonate, cellophane, polypropylene, polyethylene, polyethylene copolymers such as ethylene vinyl acetate copolymers, ethylene methyl acrylate copolymers, ethylene $C_3$ or higher vinyl monomer copolymers, ionomer films or any other substantially oxygen gas permeable materials well known in the art. Such a wrapping film may also be constructed of laminates and from microporous films having holes either chemically, mechanically or electrically formed in the layer. The purpose of this display unit is to package the meat for display to the consumer. Accordingly, the fresh cut pork should be beneficially displayed through the wrapper. Commonly, in forming the display units of the invention, one or more fresh cut pork portions are placed on a tray and then wrapped by the film discussed above. Such trays are generally rigid plastic or foamed plastic units that are about 4 inches×4 inches up through a tray that can be as much as 12 inches×18 inches. A variety of both thermoplastic and thermoforming materials can be used to form the tray which can be either transparent, translucent or opaque. The permeability of the tray is of no great importance, however, the tray can be perforated to permit exposure to the enclosed display unit atmosphere. The tray is preferably made of such well known thermoplastics as polyvinylchloride, nylon, fluorocarbon, polyurethane, or composites thereof such as polyvinylchloride polyolefin laminate, polyvinylchloride saran laminate, polyvinylchloride saran polyolefin laminates, polystyrene, ionomer, high impact polystyrene, foamed polystyrene, polycarbonate, polyester and others. Typically, a tray material was selected that can adequately support the weight of the number of fresh pork cuts that can be packaged in the tray. Such trays can be formed with a raised edge having a capacity of retaining the fresh meat within the tray. Further, protuberances on the side of the tray opposite that of the meat can serve as legs or support portions and also can act to interact with the wrapping materials to form a secure seal.

When wrapping the meat, a single sheet of the wrapping material can be wrapped securely around the tray to enclose the meat entirely. Alternatively, the wrapping film can be formed into a cylinder or cylindrical shaped sleeve, the sleeve can then be cut into individual wrapping portions, the meat inserted into the sleeve and the opposite ends of the sleeve sealed using a variety of sealing techniques. Alternatively, one or more of the display units can be inserted into a sleeve of the wrapping material, and the individual display units can then be sealed inside the individual sleeve portions by sealing and cutting the sleeve and display unit after the controlled atmosphere is installed. A variety of known wrapping techniques can be used for wrapping the display unit with the non-barrier film.

Briefly, the packaged fresh meat of the invention involves at least one display unit containing at least one wrapped portion of sliced fresh meat. A wide variety of wrapping materials are useful in forming the display unit of the invention. Wrapping materials are typically film materials having a thickness of less than about 0.2 millimeters. Preferred wrapping materials have some elasticity or stretchiness to the film that aids in wrapping and sealing the fresh pork products. The preferred film is transparent, very flexible, and is not a substantial barrier to the passage of oxygen.

The atmosphere in the display unit and in the master bag is initially obtained from the ambient atmosphere and is about 78 vol % nitrogen ($N_2$), about 21 vol % oxygen ($O_2$) with the balance argon (Ar) and other trace gases. The ambient atmosphere within the display unit is replaced with an artificial oxygen atmosphere. The atmosphere adjustment in the packaging method of the invention can be obtained by simply directing a flow of the artificial atmosphere into the partially closed display unit. A partially closed display unit comprises at least one fresh cut pork portion and the wrapping material sealed on one, two or three sides of the unit. Alternatively, the display unit can be virtually completely sealed leaving only a small unsealed opening for atmosphere modification. In adjusting the atmosphere, a flow of the artificial atmosphere can be initiated sweeping the ambient atmosphere from the package until it is completely replaced with the artificial atmosphere. Alternatively, the interior of this display unit can be exposed to a vacuum which removes the ambient atmosphere from the package. Once the ambient atmosphere is removed from the package, the atmosphere can be replaced with the artificial atmosphere. In such a process, little of the artificial atmosphere is wasted because the introduction of the artificial atmosphere replacing the ambient atmosphere leaves little of the artificial atmosphere to be released from the display unit during sealing operations subsequent to atmosphere modification.

Preferred atmosphere for the packaged pork of this invention include a high oxygen atmosphere comprising at least 65 mole % oxygen. With a high oxygen atmosphere a variety of packaging materials can be used for the display unit. In the instance that the display unit is distributed as is, the display unit can be covered with a high $O_2$/high $CO_2$ barrier film. In the instance that the display unit containing a high oxygen atmosphere is distributed in a master bag or master container containing a high oxygen atmosphere surrounding the display unit, an oxygen permeable film can be used to prepare the display unit. The oxygen permeable film permits oxygen from the master container or bag to penetrate the film and replenish any oxygen consumed within the display unit package.

Treatment Compositions

We have found that the treatment chemicals cooperate with an effective packaging system and atmosphere for maintaining the fresh appearance of the pork. Prior to packaging the fresh cut pork portions, a primal unit of pork is treated with an aqueous solution. A preferred aqueous solution of the invention comprises an alkali metal lactate component and a diacetate microbial growth inhibitor/flavor enhancer composition. Another preferred aqueous solution of the invention comprises an alkali metal lactate component, a phosphate sequestrant component, and a diacetate microbial growth inhibitor/flavor enhancer composition. These components in both useful treatment solutions cooperate to preserve the hemoglobin and myoglobin pigments in the meat, stabilize the cell structure of the meat, prevent purge from the meat and inhibit the growth of microorganisms in or on the meat surface. The aqueous treatment solution of the invention can be incorporated in the meat prior to slicing into individual serving size portions by a vacuum message, an injection, pumping the meat using a vein pumping system and others well known in the art. We have found the treatment solution of the invention increases the flavor and tenderness of the pork.

The aqueous solution used in treating the primal cuts of the invention include a major proportion of an aqueous diluent in combination with the active constituents. The first useful material in the treatment solution is an alkali metal lactate composition. Sodium and potassium lactate compositions, and equivalents thereto, are preferred in this invention. In this invention the lactate salt is used to maintain the water content of the meat. Lactate ties up water and prevents accumulation of purge in the package. Further, sodium lactate cooperates with the other ingredients in the treatment solution to obtain humectant properties, pH control and flavor enhancement. The useful concentration of lactate salt in the treatment solution can vary over a wide range. Useful concentrations of lactate salt can be from about 5 to 25 wt %, preferably 10 to 12 wt % in the aqueous treatment solution. The treated pork contains, after treatment with the aqueous solution, about 1 to 5 wt %, preferably 1 to 3 wt % of lactate (measured as sodium lactate) based on the pork product.

The second active component of the aqueous treatment solution is a phosphate sequestering or chelating agent that is optional in the first treatment solution of the invention. The sequestering agent is a chemical composition capable of bonding certain divalent and trivalent metal ions present in the meat product. A phosphate chelating agent is capable of tying up iron ($Fe^{2+}$, $Fe^{3+}$), zinc, copper, calcium, magnesium and other typically di- or trivalent metal species. Several effective phosphate sequestering agents are known to form chelation complexes with such metal ions. Such phosphate sequestering agents can contain phosphate species such as phosphate or orthophosphate (e.g., $PO_4^{-3}$, $HPO_4^{-2}$, etc.); pyrophosphate species such as $P_2O_7^{-3}$; tripolyphosphate $O—PO_2—O—PO_2—O—PO_3^{-5}$; hexameta-phosphate, cyclic condensed phosphates, including mixtures and equivalents thereto, etc. The phosphate sequestrant materials complex the trivalent metal ions in the preserved myoglobin and help to maintain the high quality appearance of the meat. The phosphate chelating agent also provides tenderizing and texturizing properties.

The primary sequestrant used in the invention is a phosphate sequestrant, however, other food grade sequestrants can be combined with the phosphate sequestrants including citric acid, tartaric acid, ethylenediamine tetracetate and other known and improved sequestering agents. The amount of sequestering agent in the treatment solution is about 0.5 to 10 wt % based on the aqueous treatment solution. The treated pork contains about 0.1 to 0.5 wt % of the phosphate sequestrant based on the pork product.

The aqueous treatment solution can contain a diacetate agent that has the capacity of reducing bacterial growth. Such a material has a strong impact on the microbial populations in the fresh meat, but also should have other functions. We have found that an alkali metal diacetate material can act as a buffer, can inhibit the growth of unwanted microorganisms in and on the meat product, and provides a desirable flavor enhancement to the meat. The preferred diacetate material, sodium hydrogen diacetate also known as sodium diacetate, CAS#: [126-96-1], is a molecular compound having the formula:

$$CH_3—CO_2.X.CH_3—CO_2H.xH_2O$$

wherein X is an alkali metal cation such as sodium ($Na^+$) or potassium ($K^+$) and x represents known hydration amounts. The alkali metal diacetate, and equivalents thereto, can be present in the aqueous treatment solution over a broad range of concentrations including about 0.05 to 5 wt % of the growth inhibitor based on the aqueous treatment solution. The treated pork product can contain up to about 0.2 wt % alkali metal diacetate, preferably about 0.01 to 0.2 wt % alkali metal diacetate, most preferably for reasons of improved taste and microbial suppression, about 0.05 to 0.1 wt % alkali metal diacetate in the pork product. After treatment, the weight of the pork will be preferably increased about 5 to 25 wt % and will contain about 1.0 to 2.0 wt % of the alkali metal lactate, about 0.2 to 0.5 wt % of the phosphate sequestrant, if used, and about 0.01 to 0.10 wt % of the diacetate bacterial growth inhibitor/flavor enhancer.

In treating the fresh pork with the aqueous treatment solution of the invention, the meat is typically treated using conventional techniques involving the introduction of the aqueous solution into the meat portion in a sufficient volume of the treatment solution to affect the properties of the material. After treatment, the weight of the pork will be increased about 0.5 to 25 wt %. The aqueous treating solution of the invention is typically made by combining the ingredients in an aqueous solution. The preferable pH of the treatment solution should be maintained between about 5.5 and 6.5.

As an optional step, either before or after the use of the aqueous treatment solution, the intact fresh primal cut containing exposed bone can be sprayed, i.e., the exterior of the chine, or bone-in meat, can be treated with an aqueous solution of a food grade reducing agent material. The aqueous solution of the reducing agent or compound causes the bone to retain its red color and to have a fresh appearance over an extended time period. Such treatment solution can be manufactured by combining the reducing agent with water in the appropriate concentrations. Preferred concentration for the reducing agent is about 1 to 3 wt % of reducing agent. The preferred food grade reducing agent for use in this invention is ascorbic acid or isoascorbic acid and the alkali metal salts thereof. Potassium and sodium ascorbate are preferred. An amount of the spray material is added to the exposed bone such that the exterior surfaces of the bone is fully contacted with the spray solution.

After the meat has been subject to the chemical treatments discussed above, the meat can be crust frozen, if desired before further processing, and tempered prior to slicing. For the purposes of this invention, crust freezing indicates that the meat is subjected to a temperature below about −18° C. to −24° C. (about 0° F. to −10° F.) for a sufficient period of time to freeze a crust layer in the meat to stabilize the meat for slicing. The depth of the frozen portion of the meat should be no more than about 16 millimeters, preferably less than 12 millimeters. In performing the crust freezing process, the meat is not slowly cooled to freeze the crust, but is quickly frozen at low temperatures for a sufficient period of time to form the frozen crust. After the frozen crust is obtained, the meat is tempered at a temperature below freezing, but close to the freezing point of the meat to aid in stable, cooled, firm, and easily sliced cut. Accordingly, in the preferred procedure of the invention, the meat is quick frozen at a temperature that is less than about −12° C. (10° F.), less than −17° C. (0° F.). Preferably a temperature of less than about −23° C. (−10° F.) to form the crust and the meat is then tempered at a temperature between about −3° C. and 0° C. (about 26° F. to 31° F.). However, the resulting meat is not substantially degraded by the freezing cycle because large damaging ice crystals are not formed in the majority of the meat during the crust freezing process. In order to form the preferred crust freezing process, the meat is taken to a chamber having appropriate coolants. Depending on the temperature of the cooled chamber and the coolants, the meat is maintained within the freezing chamber for only a limited amount of time. At about −24° C. (−10° F.), the meat should be placed in the cooling chamber for about 20–150 minutes. At about −17° C. (0° F.) the meat can be left in the cooling chamber about 50–180 minutes. Little experimentation is needed to establish the time required for the crust freezing to occur at appropriate crust freezing temperatures.

In order to obtain a crystal frozen and tempered cut, the crust frozen meat is maintained in a cooling chamber at a temperature between about −3° C. and 0° C. (26° F. and 31° F.) for a sufficient period of time to cool the meat to a uniform temperature of about −3° C. to −0.5° C. (28° F.−29° F.). The uniformly tempered meat is prepared in serving portions that can comprise a half carcass, a whole loin, 2–3 lb. roasts, chops, various cuts, ground pork, etc. Such portions can have a weight of greater than 100 lbs., can be less than 20 lbs., can be between about 2 to 16 ounces, preferably about 4 to 8 ounces. After slicing, the meat is packaged in a typical display unit within a closed film package. Preferably, the meat is introduced into a receptacle or tray and the meat and receptacle are then wrapped with a non-barrier film as discussed above. Further, the tray can contain typical absorbing units that can absorb purge or other liquid materials that can exist with a meat product. Once the display units are formed they are quickly placed in a master bag for storage, transportation, distribution and retail sale purposes. The master bag is typically made of a film material that acts as a barrier to the enclosed atmosphere. Such barrier films can comprise a relatively thick single layer of a polymer forming film material such as those described above in the portion relating to the wrapping of the display units. However, the preferable barrier material has two, three, four, five or more layers of polymeric materials, layers or coatings that cooperate to form the oxygen or $CO_2$ barrier. A multilayer barrier material of the invention can be made from a variety of thermoplastic materials that act as good barriers to the passage of oxygen and other relevant gasses. Such materials include polyvinylchloride, polyvinylidene chloride and copolymers thereof, ethylene-vinyl alcohol copolymers, acrylonitrile barrier polymers, poly (ethylene-terephthalate), polypropylene, high density polyethylene and others. The multilayer barrier structures of the invention can be made by coextrusion, lamination, coating or combination of such techniques. The combinations may result in blends that are either miscible or immiscible. A preferred film is a Cryovac P869 film with a thickness of 3.0 mil and a permeability of 145.3 cc-$O_2$/m$^2$·24 hrs. @73° F. and 100% RH. In any case, the blend seeks to combine the best properties of two or more materials to enhance the oxygen barrier value of the final structure. Using a layered structure, high barrier materials that do not have substantial mechanical stability can be combined with materials that are not as good a barrier to oxygen, carbon dioxide, etc. permeation but are high strength materials. Further, the mechanically robust film can then act as a substrate for layers of materials formed using coating or extrusion techniques. One preferred layered barrier film uses an internal skin layer, a barrier layer and an external skin layer. The barrier layer is tied to the external and the internal skin layer using an adhesive tie layer to maintain the integrity of the five layer barrier corkscrewed shape. Using such multilayer techniques, a thin barrier layer can be used conserving valuable materials. In such constructions, a thin layer of the barrier polymer can be coated on a substrate. For example, a water born latex can be used to coat paper or a polymer such as polypropylene or polyethylene terephthalate. Commonly two coats are applied to give a total barrier thickness of 5 microns, up to 10 microns or more. Two coats are useful so that minor holes in the first layer can be covered with the second layer. Adhesion of the coating is important for all substrates and it is important that the material does not soak into the substrate (there is substantial hold out of the coating on the first layer). When the surface energy or the nature of the materials are substantially different, the substrate or layer must receive a surface treatment prior to coating. A typical application is a vinylidenechloride copolymer latex on an oriented polypropylene film. One significant commercial application of a solvent coating on a film involves a solution of polyvinylidenechloride resin dissolved in a polar solvent coated onto a cellophane or polyethylene terephthalate film. Also, ethylene-vinyl alcohol polymers are potentially applicable for solvent coating. Certain inorganic coatings on polymers are also known to have substantial potential to enhance barrier properties, however, at this time commercial development of inorganic layers are not significant. Further, in any layer manufactured in the barrier polymer, a polymer blend or alloy can be used. Such blends involve polymers which are soluble or at least dispersible. Further, the coating solutions used to form any of the barrier coatings of the application can contain two or more polymers which tend to be more compatible because of the solution coating process.

The resulting barrier films typically have a greater thickness than single layer films discussed above. The thickness of such films can range from 1000 $\mu$m to about 2000 $\mu$m. The important barrier parameter for the master bag film is oxygen permeability. The oxygen permeability of the master bag film should be sufficient such that the oxygen content of the master bag does not drop substantially during transportation, distribution, and storage up to final retail sale. The oxygen atmosphere within the master bag helps to maintain the quality appearance of the meat. Accordingly, during the presence of the display units within the master bag, the oxygen content of the atmosphere within the bag does not drop more than about 5 vol % due to consumption of oxygen by the contents of the bag and through permeation of oxygen from the bag.

As in the packaging of the fresh cut pork in the display units, the display units are introduced into the master bag and the atmosphere within the master bag is adjusted to the required proportions of oxygen. Similarly, the ambient atmosphere within the master bag can be removed by exposure of the internal spaces within the master bag to a vacuum. Once the ambient atmosphere is removed, the artificial atmosphere can then be introduced into the bag ensuring that the atmosphere contains the desirable proportion of oxygen and carbon dioxide required to maintain the quality of the cut meat. Once the desired atmosphere is obtained, the bag is sealed and is then distributed into the retail market. The handling of the display units within the master bag of the invention is often made significantly easier by placing the master bag and display units in a corrugated paperboard tray which is sized to accept two, four, six, eight, ten, twelve or more display units contained within the master bag. Alternatively, the display units can be introduced into the corrugated paperboard tray, the display units and paperboard tray can be then introduced into the barrier bag for atmosphere adjustment prior to sealing. In such an assembly, the display units can be stacked into layers having two or three layers of display units, however, any substantial stacking greater than two or three units can reduce the quality of the cut pork portions at the bottom of the stack. Accordingly, the units are stacked in preferably two or three units at the most.

To aid in storage, distribution, etc. the master bag units can be introduced into a frame that can support the weight of the unit but maintains a separation of the units during handling. Such units can be wrapped in a pallet arrangement and stored and distributed in that form until delivered to a retail location.

The above description of the treated fresh cut pork portions, the wrapping, the atmosphere and the treatment solutions provide a basis for understanding the metes and bounds of the invention. The following examples and data further illustrate the invention and contain a best mode. We have conducted a series of tests. The primary objective of the testing is to produce treated boneless pork cuts that have minimal purge, color stability, increased tenderness and a total shelf life (including three days in the display case) of at least seventeen days or more. Sample preparation was accomplished as follows. Four center cut boneless pork loins for each treatment were pumped 112% with one of four different solutions. All loins were placed on a rack and were crust frozen in a blast freezer (0° F.) for 1.5 hours and were then tempered in a cooler overnight to a uniform temperature of 28–29° F. The tempered loins were sliced into ⅝ inch chops and placed on styrofoam trays. The trays were overwrapped with Cryovac® SSD330 shrink film [OVERWRAP FILM: CRYOVAC® SSD-330 2.4 Mils Thick (60 Gauge) with a permeability of 10,000 cc-$O_2$/m$^2$/24 Hrs@100% RH/73° F. and 39,000 cc-$CO_2$/M$^2$/24 Hrs@100% RH/73° F.] on a packaging machine. The packages were placed in a cryovac barrier master bag [MASTER BAG:CRYOVAC P869 3.0 Mils Thick with 145.3 cc-$O_2$/m$^2$/24 Hrs@100% RH/73° F.] and backflushed with a gas mixture of 80% oxygen/20% carbon dioxide. The product was then boxed. The boxes were held in a 28° F. cooler for 24 hours and were then moved to a 36–38° F. cooler for an additional 11 days of storage. After 12 total days of storage (from date of pack) in the master bag, the packages were removed from the master bags and were placed in a 36–38° F. display case. Samples from each of the four treatments were sent to the lab.

Samples from each treatment were again sent to the lab after two days and four days in the display case.

All test samples were packaged and backflushed in barrier master bags according to the specifications shown below. A summary of the results of the microbial testing is shown in the following table:

| Injected Boneless Loins | | |
|---|---|---|
| TREATMENT | | |
| Sampled 12/04 | TPC | PSYCHRO |
| 1-1 | 330 | 3500 |
| 1-2 | 560 | 9300 |
| 1-3 | 70 | 13000 |
| 1-4 | 180 | 32000 |
| 2-1 | 1.2M | 3.0M |
| 2-2 | 300000 | 1.5M |
| 2-3 | 130000 | 2.3M |
| 2-4 | 125000 | 1.4M |
| 3-1 | 330000 | 150000 |
| 3-2 | 31000 | 340000 |
| 3-3 | 45000 | 3.1M |
| 3-4 | 43000 | 720000 |
| 4-1 | 5.9M | 85M |
| 4-2 | 4.6M | 30M |
| 4-3 | 4.3M | 5.2M |
| 4-4 | 400000 | 3.1M |
| TREATMENT | | |

1-1 to 1-4: Sodium tri-polyphosphate, sodium lactate, sodium diacetate.
2-1 to 2-4: Sodium tri-polyphosphate, sodium lactate, potassium lactate
3-1 to 3-4: Sodium tri-polyphosphate, potassium lactate.
4-1 to 4-4: Cure gel (phosphates + hydrolyzed gelatin).

| Samp 12/08 | TPC | PSYCHRO |
|---|---|---|
| 1-1 | 180 | 50000 |
| 1-2 | 340 | 34000 |
| 1-3 | 170000 | 160000 |
| 1-4 | 190000 | 180000 |
| 2-1 | 21M | 22M |
| 2-2 | 7.4M | 7.3M |
| 2-3 | 5.7M | 7.7M |
| 2-4 | 4.4M | 4.2M |
| 3-1 | 940000 | 1.4M |
| 3-2 | 1.0M | 630000 |
| 3-3 | 5.8M | 6.2M |
| 3-4 | 780000 | 410000 |
| 4-1 | 40M | 68M |
| 4-2 | 15M | 13M |
| 4-3 | 5.2M | 5.1M |
| 4-4 | 3.7M | 5.3M |

TPC = TOTAL MESOPHILIC PLATE COUNT/GRAM
PSYCHRO = PSYCHROPHILLIC BACTERIA/GRAM
M = × $10^6$ (MILLIONS)

This data shows that, under similar atmospheric conditions, the use of the treatment of the invention comprising lactate, a phosphate sequestrant and sodium diacetate, resulted in substantially reduced microbial growth. Similar experiments, conducted with a treatment similar to 1-1 to 1-4 (above), except consisting essentially of lactate and diacetate showed similar antimicrobial properties. The pork had reduced purge and was a high quality consumer offering in these tests. This treatment solution will improve pork and reduce microbial growth under other atmospheres.

The test data was obtained using the following laboratory protocols:
Aerobic Plate Count
    BAM 8th Edition 1995, Aerobic Plate Count, Method 3.01

Psychrophilic Count
  Compendium of Methods for the Microbiological Examination of Foods 3rd Edition, 1992, Chapter 9, pp. 153–168.
  USDA Analytical Chemistry Laboratory Guidebook, 1993, Method PHM.
TBA
  Journal American Oil Chemists Society, January 1960, Vol XXXVII, No. 1, pp. 44–48.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A process for packaging fresh pork to obtain improved appearance and extended shelf life, which process comprises:

(a) treating fresh pork with an aqueous solution consisting essentially of a major proportion of water and an alkali metal lactate agent and an alkali metal diacetate microbial growth inhibitor, said aqueous solution used in an amount sufficient to increase the weight of the pork by up to about 125 wt-% of its original weight, to produce a treated pork comprising about 1 to 5 wt % of alkali metal lactate and about 0.01 to 0.2 wt % of a diacetate microbial growth inhibitor, the percentages based on the pork; and (b) packaging the treated fresh pork in a closed film package.

2. The process of claim 1 wherein pork comprises bone-in pork or a boneless pork.

3. The process of claim 2 wherein the pork comprises bone-in pork and the exterior of the bone is contacted with an aqueous solution of ascorbic acid or a salt thereof prior to treating with the aqueous solution.

4. The process of claim 1 wherein the pork is crust frozen prior to packaging.

5. The process of claim 1 wherein the treated pork is crust frozen at a temperature of about −3° C. to 0.5° C. and wherein the packaged treated fresh pork is maintained at a temperature of less than about 0° C.

6. The process of claim 5 wherein the crust frozen pork is tempered and the packaged treated fresh pork is maintained at a temperature of between about −3° C. and 0° C.

7. The process of claim 1 wherein the aqueous solution contains 0.1 to 15 wt-% soluble solids.

8. The process of claim 7 wherein the aqueous solution consists essentially of 0.05 to 5 wt. % sodium diacetate and 1 to 5 wt. % sodium lactate.

9. The process of claim 1 wherein the pork is sliced prior to packaging.

10. The process of claim 1 wherein the diacetate microbial growth inhibitor comprises sodium diacetate.

11. The process of claim 10 wherein the sodium diacetate comprises $CH_3CO_2Na \cdot CH_3CO_2H$ or its hydrated form.

12. The process of claim 1 wherein the lactate agent comprises sodium lactate.

13. The process of claim 1 wherein the closed film package is a display unit comprising a thermoplastic foam tray, at least one serving portion of pork and a transparent film.

14. The process of claim 1 wherein the weight of the fresh pork is increased through the addition of a pumping solution by up to about 120 wt %.

15. The process of claim 1 wherein the treated pork is divided thereby forming serving portions, the serving portions are packed in a closed oxygen permeable package to form a display unit with an enhanced oxygen atmosphere in the closed package, and at least one display unit is packed in a closed oxygen barrier container having an internal atmosphere comprising an enhanced oxygen atmosphere.

16. The process of claim 15 wherein the barrier container is a barrier bag.

17. The process of claim 16 wherein the barrier bag has an oxygen permeability of less than about 200 cc-$O_2$/m$^2$·day·atm.

18. The process of claim 15 wherein the display unit comprises a thermoplastic foam tray, at least one serving portion of pork and a film.

19. The process of claim 15 wherein the display unit comprises a thermoplastic foam tray, at least one serving portion of pork and a polyvinylidene chloride film.

* * * * *